United States Patent
Rao et al.

(10) Patent No.: US 10,368,310 B2
(45) Date of Patent: Jul. 30, 2019

(54) POWER SAVING IN A COMPUTING DEVICE THAT INCLUDES MULTIPLE RADIOS

(71) Applicant: Microsoft Technology Licensing, LLC, Redmond, WA (US)

(72) Inventors: Srinivasa L. Rao, Redmond, WA (US); Dong Hee Pi, Bellevue, WA (US); Mahesh Yadav, Redmond, WA (US); Joseph Michael Schaefer, Issaquah, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/672,572

(22) Filed: Aug. 9, 2017

(65) Prior Publication Data

US 2019/0053161 A1 Feb. 14, 2019

(51) Int. Cl.
*H04W 8/22* (2009.01)
*H04W 4/20* (2018.01)
(Continued)

(52) U.S. Cl.
CPC ... *H04W 52/0232* (2013.01); *H04W 52/0225* (2013.01); *H04W 52/0229* (2013.01);
(Continued)

(58) Field of Classification Search
CPC .......... H04W 4/00; H04W 4/20; H04W 8/00; H04W 48/08; H04W 8/005; H04W 8/08;
(Continued)

(56) References Cited

U.S. PATENT DOCUMENTS 7,801,095 B2   9/2010   Kil
8,570,993 B2   10/2013  Austin et al.
(Continued)

OTHER PUBLICATIONS

Wexler, Joanie, "Under the hood: Wi-Fi power save", http://www.networkworld.com/article/2296872/network-security/under-the-hood--wi-fi-power-save.html, Mar. 28, 2007, 2 pages.
(Continued)

*Primary Examiner* — Blane J Jackson
(74) *Attorney, Agent, or Firm* — Ray Quinney & Nebeker PC; Thomas M. Hardman; Matthew M. Walker

(57) ABSTRACT

A computing device may include an accessory radio that facilitates point-to-point wireless connectivity between the computing device and one or more accessory devices. The accessory radio may periodically broadcast its presence to the one or more accessory devices while operating in an active state. The accessory radio may transition from the active state to a sleep state after a period of inactivity. The computing device may also include a general purpose radio that may facilitate general wireless connectivity between the computing device and other devices. The general purpose radio may listen for any messages that are intended for the accessory radio while the accessory radio is in the sleep state. The general purpose radio may activate the accessory radio in response to the general purpose radio receiving a message, while the accessory radio is in the sleep state, that satisfies at least one activation condition.

20 Claims, 6 Drawing Sheets

(51) Int. Cl.
*H04W 52/02* (2009.01)
*H04B 7/15* (2006.01)
*H04W 8/00* (2009.01)
*H04W 40/24* (2009.01)
*H04W 84/12* (2009.01)
*H04W 88/06* (2009.01)

(52) U.S. Cl.
CPC ............ *H04W 8/005* (2013.01); *H04W 40/24* (2013.01); *H04W 52/0251* (2013.01); *H04W 84/12* (2013.01); *H04W 88/06* (2013.01)

(58) Field of Classification Search
CPC ............ H04W 28/02; H04W 28/0221; H04W 52/0209; H04W 52/0212; H04W 52/0225; H04B 7/14; H04B 7/15; H04B 7/155; H04B 7/15507
See application file for complete search history.

(56) References Cited

U.S. PATENT DOCUMENTS

| | | | |
|---|---|---|---|
| 8,611,268 B1 | 12/2013 | Thandaveswaran | |
| 2011/0119510 A1 | 5/2011 | Ahn | |
| 2012/0155510 A1* | 6/2012 | Hirsch | H04B 1/3805 |
| | | | 375/132 |
| 2013/0223419 A1* | 8/2013 | Ghosh | H04W 52/0235 |
| | | | 370/338 |
| 2013/0235774 A1* | 9/2013 | Jo | H04W 52/0219 |
| | | | 370/311 |
| 2014/0112229 A1 | 4/2014 | Merlin et al. | |
| 2014/0126442 A1 | 5/2014 | Jafarian et al. | |
| 2014/0219148 A1 | 8/2014 | Zhao et al. | |
| 2015/0309807 A1 | 10/2015 | Sim et al. | |
| 2016/0029311 A1 | 1/2016 | Wolkowicki et al. | |
| 2016/0100359 A1 | 4/2016 | Liu et al. | |
| 2016/0192293 A1* | 6/2016 | Dai | H04W 52/0216 |
| | | | 370/238 |
| 2016/0219510 A1 | 7/2016 | Asterjadhi et al. | |
| 2017/0127347 A1 | 5/2017 | Skeoch et al. | |
| 2017/0127349 A1 | 5/2017 | Skeoch et al. | |
| 2017/0245133 A1* | 8/2017 | Fontaine | H04W 4/21 |
| 2017/0366937 A1* | 12/2017 | Lee | H04W 4/023 |

OTHER PUBLICATIONS

Yomo, et al., "Receiver Design for Realizing On-Demand WiFi Wake-up using WLAN Signals", in Proceedings of IEEE Global Communications Conference, Dec. 3, 2012, pp. 1-6.

Haratcherev, et al., "Low-power sleep mode Bell Labs and out-of-band wake-up for indoor Access Points", in Proceedings of 2nd International Workshop on Green Communications, Dec. 4, 2009, pp. 1-16.

"International Search Report and Written Opinion Issued in PCT Application No. PCT/US2018/038425", dated Aug. 14, 2018, 11 Pages.

* cited by examiner

POWER SAVING IN A COMPUTING DEVICE THAT INCLUDES MULTIPLE RADIOS

CROSS-REFERENCE TO RELATED APPLICATIONS

N/A

BACKGROUND

There are many different types of computing devices in use today, including desktop computers, laptop computers, tablet computers, smartphones, virtual reality headsets, wearable computing technology, and the like. Computing devices may be used to perform a wide variety of tasks, such as accessing websites via the Internet, using word processing software to create documents, playing video games, composing and sending email and/or text messages, watching videos, listening to music, and so forth.

Under some circumstances, one or more accessory devices may be used together with a computing device. For example, if a user is playing a video game on a computing device, a gaming controller may be connected to the computing device so that the user is able to provide input to the video game (e.g., to control an object or character in the video game).

Communication between a computing device and an accessory device may occur wirelessly. To facilitate such wireless communication, a computing device may include multiple radios. In addition to a radio that facilitates general wireless connectivity between the computing device and other devices, the computing device may also include at least one radio that is specifically intended to facilitate point-to-point wireless connectivity between the computing device and one or more accessory devices.

SUMMARY

In accordance with one aspect of the present disclosure, a computing device that includes an accessory radio and a general purpose radio is disclosed. The accessory radio may facilitate point-to-point wireless connectivity between the computing device and one or more accessory devices. The accessory radio may periodically broadcast its presence to the one or more accessory devices while operating in an active state. The accessory radio may transition from the active state to a sleep state after a period of inactivity. The general purpose radio may facilitate general wireless connectivity between the computing device and other devices. The general purpose radio may listen for any messages that are intended for the accessory radio while the accessory radio is in the sleep state. The general purpose radio may activate the accessory radio in response to the general purpose radio receiving a message, while the accessory radio is in the sleep state, that satisfies at least one activation condition.

The computing device may not be connected to any accessory devices and may not receive any connection requests from any accessory devices during the period of inactivity. The accessory radio may transition from the active state to the sleep state after the period of inactivity exceeds a defined threshold.

The message that the general purpose radio receives while the accessory radio is in the sleep state may include a source address that matches an address of an accessory device. The general purpose radio may activate the accessory radio in response to receiving the message.

The message that the general purpose radio receives while the accessory radio is in the sleep state may include a source address that partially matches an address of an accessory device. The message may also include a message type indicator whose value is within a defined range of values. The general purpose radio may activate the accessory radio in response to receiving the message.

The general purpose radio may activate the accessory radio by sending an activation message to the accessory radio. The activation message may include information that enables the accessory radio to establish a point-to-point wireless connection with an accessory device.

The accessory radio and the general purpose radio may operate in accordance with a same wireless communication protocol.

The computing device may further include a battery that supplies operating power to the computing device. The accessory radio may use less power while in the sleep state than in the active state.

In accordance with another aspect of the present disclosure, a computing device that includes an accessory radio and a wireless local area network (WLAN) radio is disclosed. The accessory radio may facilitate point-to-point wireless connectivity between the computing device and one or more accessory devices. The accessory radio may periodically transmit a beacon signal to the one or more accessory devices while operating in an active state. The accessory radio may transition from the active state to a sleep state after a period of inactivity exceeds a defined threshold. The WLAN radio may facilitate wireless communication between the computing device and other devices via a WLAN. The WLAN radio may receive messages that are addressed to the accessory radio while the accessory radio is in the sleep state. The WLAN radio may activate the accessory radio in response to the WLAN radio receiving a message, while the accessory radio is in the sleep state, that satisfies at least one activation condition.

The computing device may not be connected to any accessory devices and may not receive any connection requests from any accessory devices during the period of inactivity.

The message that the WLAN radio receives while the accessory radio is in the sleep state may include a source address that matches an address of an accessory device. The WLAN radio may activate the accessory radio in response to receiving the message.

The message that the WLAN radio receives while the accessory radio is in the sleep state may include a source address that partially matches an address of an accessory device. The message may also include a message type indicator whose value is within a defined range of values. The WLAN radio may activate the accessory radio in response to receiving the message.

The computing device may further include an accessory radio driver that controls the accessory radio and a WLAN radio driver that controls the WLAN radio. The WLAN radio driver may send an activation message to the accessory radio driver in order to activate the accessory radio.

The activation message may include an address of an accessory device that sends the message that the WLAN radio receives while the accessory radio is in the sleep state. The activation message may also include a message type indicator that identifies a message category to which the message corresponds. The activation message may also include a channel indicator that identifies which of a plurality of available wireless channels should be used for wireless communication between the computing device and the accessory device.

The accessory radio and the WLAN radio may both operate in accordance with an Institute of Electrical and Electronics Engineers (IEEE) 802.11 wireless communication protocol.

In accordance with another aspect of the present disclosure, a method for saving power in a computing device that includes a plurality of radios is disclosed. The method may include an accessory radio entering an active state and periodically broadcasting its presence to accessory devices while in the active state. The method may also include the accessory radio transitioning from the active state into a sleep state after a period of inactivity. The method may also include a general purpose radio listening for any messages that are intended for the accessory radio while the accessory radio is in the sleep state. The method may also include the general purpose radio activating the accessory radio in response to the general purpose radio receiving a message, while the accessory radio is in the sleep state, that satisfies at least one activation condition.

The computing device may not be connected to any accessory devices and may not receive any connection requests from any accessory devices during the period of inactivity. The accessory radio may transition from the active state to the sleep state after the period of inactivity exceeds a defined threshold.

The general purpose radio may send an activation message to the accessory radio in order to activate the accessory radio. The activation message may include information that enables the accessory radio to establish a point-to-point wireless connection with an accessory device.

The activation message may include an address of an accessory device that sends the message that the general purpose radio receives while the accessory radio is in the sleep state. The activation message may also include a message type indicator that identifies a message category to which the message corresponds. The activation message may also include a channel indicator that identifies which of a plurality of available wireless channels should be used for wireless communication between the computing device and the accessory device.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Additional features and advantages of implementations of the disclosure will be set forth in the description that follows, and in part will be apparent from the description, or may be learned by the practice of the teachings herein. The features and advantages of such implementations may be realized and obtained by means of the instruments and combinations particularly pointed out in the appended claims. These and other features will become more fully apparent from the following description and appended claims, or may be learned by the practice of such implementations as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, similar reference numbers have been used for similar features in the various embodiments. Unless indicated otherwise, these similar features may have the same or similar attributes and serve the same or similar functions. Understanding that the drawings depict some example embodiments, the embodiments will be described and explained with additional specificity and detail through the use of the accompanying drawings in which.

DETAILED DESCRIPTION

As noted above, a computing device may include multiple radios, including at least one radio that is specifically intended to facilitate point-to-point wireless connectivity between the computing device and one or more accessory devices. This type of radio may be referred to herein as an accessory radio.

A computing device with an accessory radio may be configured so that once an accessory device has been wirelessly connected to the computing device, the accessory radio thereafter periodically broadcasts its presence to accessory devices. For example, the accessory radio may periodically transmit a beacon signal. Advantageously, this may enable accessory devices to quickly connect (or reconnect) to the computing device. This type of configuration may not be optimal, however, especially for battery-powered devices. A user may only occasionally want to connect accessory devices to the computing device, and having the accessory radio periodically transmitting a beacon signal may unnecessarily drain the battery. While it may be possible for users to manually deactivate the accessory radio, many users do not know how to do this. Even for those users who do know how, it may be inconvenient to have to manually activate the accessory radio when it is needed and then manually deactivate the accessory radio when it is not needed.

The present disclosure is generally related to saving power in a computing device that has multiple radios. A computing device may include a general purpose radio that facilitates general wireless connectivity between the computing device and other devices. The computing device may also include an accessory radio that facilitates point-to-point wireless connectivity between the computing device and one or more accessory devices. In accordance with the present disclosure, the accessory radio may transition from an active state (in which the accessory radio periodically transmits a beacon signal) to a sleep state (in which the accessory radio does not periodically transmit a beacon signal) after a period of inactivity. While the accessory radio is in a sleep state, the general purpose radio may listen for any messages that are intended for the accessory radio. When a message is received that meets one or more activation conditions, the general purpose radio may wake up the accessory radio and provide the accessory radio with relevant information for taking appropriate action in response to the message (such as establishing a point-to-point wireless connection with an accessory device).

Figure 1:
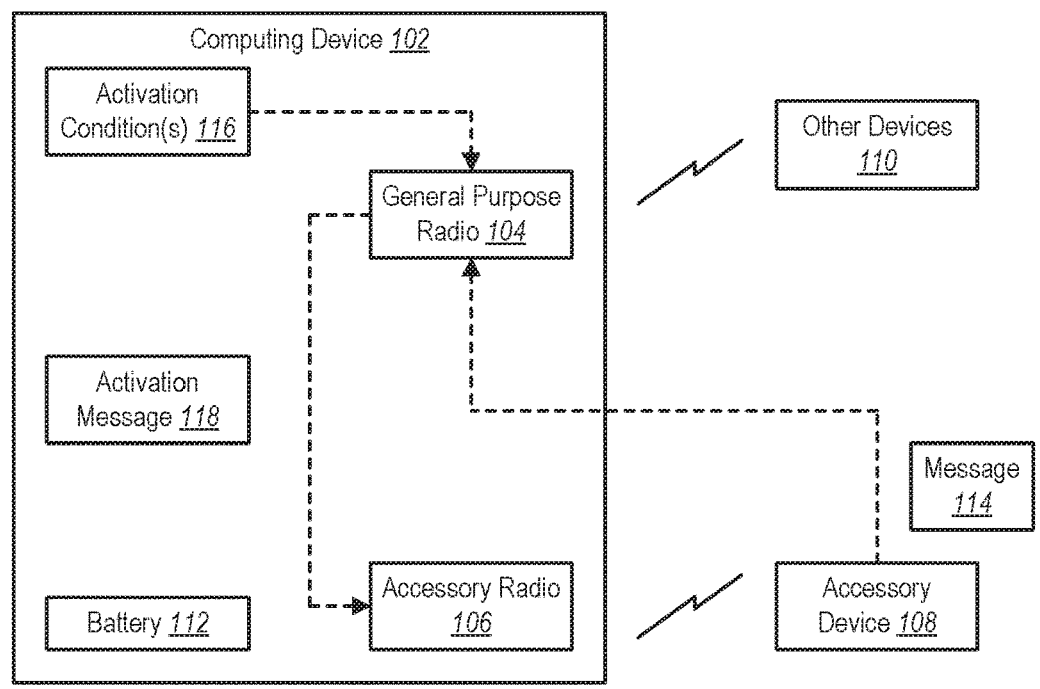
FIG. 1 illustrates an example of a system for saving power in a computing device that has multiple radios, including a general purpose radio and an accessory radio.

FIG. 1 illustrates an example of a system 100 for saving power in a computing device 102 that includes multiple radios 104, 106. An accessory device 108 may be wirelessly connected to and used with the computing device 102. Many different types of accessory devices 108 may be used with the computing device 102. For example, the accessory device 108 may be a wireless gaming controller that enables a user to provide input to a video game that is being played on the computing device 102 (which may be a laptop computer, a tablet computer, a virtual reality headset, etc.). Although for the sake of simplicity just one computing device 102 and one accessory device 108 are shown in FIG. 1, the present disclosure is applicable to a system that includes multiple computing devices 102 and/or multiple accessory devices 108.

The computing device 102 may include a general purpose radio 104 that facilitates general wireless connectivity between the computing device 102 and one or more other devices 110. The computing device 102 may also include an accessory radio 106 that facilitates point-to-point wireless connectivity between the computing device 102 and one or more accessory devices 108.

Both the general purpose radio 104 and the accessory radio 106 may be operable in at least two states: an active state and at least one sleep state. When the accessory radio 106 is in the active state, the accessory radio 106 may periodically broadcast its presence to accessory devices 108. For example, the accessory radio 106 may periodically transmit a beacon signal. The beacon signal may enable accessory devices 108 to discover the computing device 102.

The computing device may include a battery 112, which may supply operating power to the computing device 102 under some circumstances. In order to save power so that the battery 112 will last as long as possible, the accessory radio 106 may transition from the active state to a sleep state after a period of inactivity. The accessory radio 106 may use less power when it is operating in a sleep state as compared to when it is operating in the active state. For example, the accessory radio 106 may be configured so that it does not transmit a beacon signal (or otherwise broadcast its presence) to accessory devices 108 when it is in a sleep state.

Unfortunately, however, when the accessory radio 106 is in a sleep state, it may be difficult for a user to connect (or reconnect) an accessory device 108 to the computing device 102. Although the accessory radio 106 could periodically wake up and transmit a beacon signal, this may not provide a satisfactory solution. Having the accessory radio 106 wake up relatively frequently to transmit beacon signals may consume a significant amount of power and unnecessarily drain the battery 112. On the other hand, if the accessory radio 106 wakes up relatively infrequently to transmit beacon signals, there may be a noticeable (and unacceptable) delay between the point in time when the user begins trying to connect the accessory device 108 to the computing device 102 and the point in time when the accessory radio 106 wakes up.

In order to enable a user to quickly and conveniently connect an accessory device 108 to the computing device 102, even when the accessory radio 106 is in a sleep state, the general purpose radio 104 may listen for any messages 114 that are intended for the accessory radio 106 while the accessory radio 106 is in a sleep state. For example, the general purpose radio 104 may listen for any messages 114 that satisfy at least one activation condition 116.

When the general purpose radio 104 receives a message 114 that satisfies at least one activation condition 116, the general purpose radio 104 may activate the accessory radio 106. In other words, the general purpose radio 104 may cause the accessory radio 106 to wake up (i.e., transition from a sleep state to the active state). For example, the general purpose radio 104 may send a message 118 to the accessory radio 106 that instructs the accessory radio 106 to wake up. Such a message 118 may be referred to herein as an activation message 118. The activation message 118 may include information that enables the accessory radio 106 to take appropriate action in response to the message 114 that was received by the general purpose radio 104 on behalf of the accessory radio 106 while the accessory radio 106 was in a sleep state. For example, the activation message 118 may include information that enables the accessory radio 106 to establish a point-to-point wireless connection with the accessory device 108.

Figure 2:
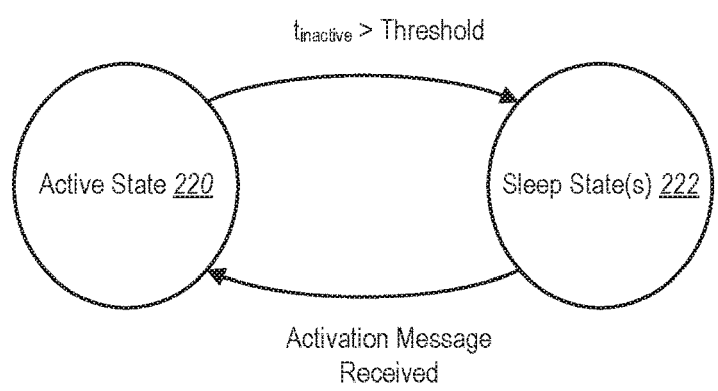
FIG. 2 is a state diagram that illustrates at least some of the possible states in which the accessory radio may operate.

FIG. 2 is a state diagram that illustrates at least some of the possible states in which the accessory radio 106 may operate, including an active state 220 and at least one sleep state 222. As noted above, when the accessory radio 106 is in the active state 220, the accessory radio 106 may periodically broadcast its presence to accessory devices 108 by, for example, periodically transmitting a beacon signal. In contrast, the accessory radio 106 may be configured so that it does not transmit a beacon signal (or otherwise broadcast its presence) to accessory devices 108 when it is in a sleep state 222.

As also noted above, the accessory radio 106 may be configured so that it transitions from the active state 220 to a sleep state 222 after a period of inactivity. More specifically, the accessory radio 106 may transition from the active state 220 to a sleep state 222 when the period of inactivity (which is denoted $t_{inactive}$ in FIG. 2) exceeds a defined threshold. A period of inactivity may be defined as a period of time during which the computing device 102 is not connected to any accessory devices 108 and does not receive any connection requests from any accessory devices 108. The accessory radio 106 may transition from a sleep state 222 back to the active state 220 in response to receiving an activation message 118 from the general purpose radio 104.

Although just a single sleep state 222 is shown in FIG. 2, the accessory radio 106 may be capable of operating in multiple sleep states 222 that use different amounts of power. In some embodiments, the accessory radio 106 may, following a period of inactivity, transition from the active state 220 into the sleep state 222 that uses the least amount of power.

In some embodiments, the accessory radio 106 may sometimes wake up (i.e., transition from a sleep state 222 back to the active state 220) on its own, independent of receiving an activation message 118 from the general purpose radio 104. However, the time interval during which the accessory radio 106 remains in a sleep state 222 before independently waking up may be steadily increased. At some point, the time interval may become so large that, for practical purposes, the accessory radio 106 effectively remains in a sleep state 222 unless an activation message 118 is received from the general purpose radio 104.

To take a specific example, the accessory radio 106 may be configured to initially wake up 1 second after going to sleep (even if no activation message 118 has been received), transmit a beacon signal, and then go back to sleep again if no response is received from an accessory device 108. The time interval during which the accessory radio 106 remains asleep may then be increased from 1 second to 2 seconds. Thus, 2 seconds after going back to sleep, the accessory radio 106 may wake up again, transmit another beacon signal, and go back to sleep again if no response is received from an accessory device 108. The time interval during which the accessory radio 106 remains asleep may then be increased from 2 seconds to 5 seconds, then from 5 seconds to 10 seconds, then from 10 seconds to 20 seconds, and so on, until the accessory radio 106 remains asleep for an extremely long period of time (e.g., several weeks or months). At this point, the time interval during which the accessory radio 106 remains asleep before independently waking up has become so large that, for practical purposes, the accessory radio 106 effectively remains in a sleep state 222 unless an activation message 118 is received from the general purpose radio 104.

Figure 3:
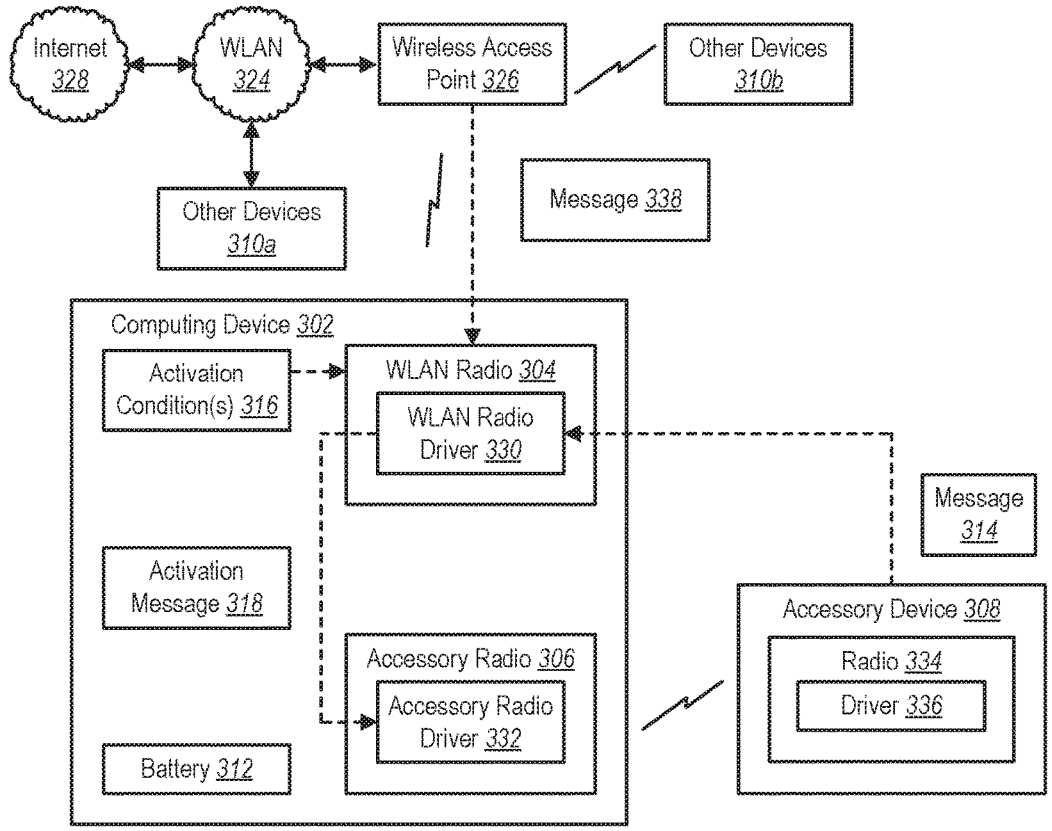
FIG. 3 illustrates an example of another system for saving power in a computing device that has multiple radios, including a wireless local area network (WLAN) radio and an accessory radio.

FIG. 3 illustrates another example of a system 300 for saving power in a computing device 302 that includes multiple radios 304, 306. In this system 300, the computing device 302 may include a radio 304 that facilitates wireless communication between the computing device 302 and other devices 310a, 310b via a WLAN 324. This type of radio may be referred to herein as a WLAN radio 304. The WLAN radio 304 is one example of the general purpose radio 104 that was discussed above in relation to FIG. 1.

When the computing device 302 is connected to the WLAN 324, the computing device 302 may use the WLAN radio 304 to communicate with a wireless access point 326 of the WLAN 324, such that the computing device 302 itself may be an addressable endpoint on the WLAN 324. The computing device 302 may be assigned an Internet Protocol (IP) address and may be capable of communicating with other devices 310a, 310b over the WLAN 324 using IP-based protocols such as Transmission Connection Protocol (TCP), Uniform Datagram Protocol (UDP), etc. The WLAN 324 may also provide a connection to the Internet 328.

The computing device 302 may include a driver 330 for the WLAN radio 304, which may be referred to herein as a WLAN radio driver 330. The WLAN radio driver 330 may control various aspects of the operation of the WLAN radio 304. The WLAN radio 304, WLAN radio driver 330, wireless access point 326, and other components of the WLAN 324 may operate in accordance with any wireless communication protocol that supports WLAN communications, including but not limited to the Institute of Electrical and Electronics Engineers (IEEE) 802.11 standards, which are sometimes referred to as Wi-Fi®.

The computing device 302 may also include an accessory radio 306. The accessory radio 306 may operate similarly to the accessory radio 106 that was described above in relation to FIG. 1. Thus, the accessory radio 306 may facilitate point-to-point wireless communication between the computing device 302 and one or more accessory devices 308. Point-to-point wireless communication is different from wireless communication via the WLAN 324. When the computing device 302 is connected to an accessory device 308 via a point-to-point wireless connection, wireless communication between the computing device 302 and the accessory device 308 may occur directly, without the need to communicate with a wireless access point 326. In addition, the point-to-point wireless connection may not enable the accessory device 308 to access the Internet 328 or communicate with other devices 310a, 310b that are connected to the WLAN 324.

The computing device 302 may include a driver 332 for the accessory radio 306, which may be referred to herein as an accessory radio driver 332. The accessory radio driver 332 may control various aspects of the operation of the accessory radio 306. The accessory radio 306 and the accessory radio driver 332, as well as the radio 334 of the accessory device 308 and its driver 336, may operate in accordance with any wireless communication protocol that supports point-to-point wireless communication. In some embodiments, wireless communication between the computing device 302 and the accessory device 308 may occur in accordance with the IEEE 802.11 standards. In addition to facilitating wireless communication via a WLAN 324, the IEEE 802.11 standards may also support point-to-point wireless communication. Thus, in some embodiments, both the WLAN radio 304 and the accessory radio 306 may operate in accordance with the same wireless communication protocol (e.g., IEEE 802.11).

The accessory radio 306 may be considered to be an access point in the sense that it broadcasts its presence to accessory devices 308 (when in the active state 220) so that the accessory devices 308 can discover the computing device 302 and wirelessly connect to it. However, the accessory radio 306 does not perform all of the same functions as the wireless access point 326 of the WLAN 324. For example, the accessory radio 306 may not enable the accessory devices 308 to gain access to the WLAN 324 or the Internet 328.

The WLAN radio 304 may be different from the accessory radio 306 in that the WLAN radio 304 may not periodically transmit a beacon signal (or otherwise broadcast its presence to other devices). In the terminology of IEEE 802.11, the WLAN radio 304 may be considered to be a station.

If both the WLAN radio 304 and the accessory radio 306 operate in accordance with IEEE 802.11, then the WLAN radio 304 may be capable of receiving messages 314 intended for the accessory radio 306 in addition to receiving messages 338 intended for the WLAN radio 304. When the accessory radio 306 is in the active state 220, however, the WLAN radio 304 may ignore any messages 314 that are intended for the accessory radio 306. In other words, even though the WLAN radio 304 may be capable of receiving messages 314 intended for the accessory radio 306, the WLAN radio 304 may not read or otherwise process such messages 314 as long as the accessory radio 306 is in the active state 220. As discussed above, after a period of inactivity the accessory radio 306 may transition from the active state 220 to a sleep state 222 in order to save power and prevent the battery 312 of the computing device 302 from being drained unnecessarily. When the accessory radio 306 transitions from the active state 220 to a sleep state 222, the WLAN radio 304 may begin reading and processing any messages 314 that are intended for the accessory radio 306 in addition to reading and processing any messages 338 that are intended for the WLAN radio 304.

When the WLAN radio 304 receives a message 314 that is intended for the accessory radio 306 while the accessory radio 306 is in a sleep state 222, the WLAN radio 304 may check to see whether the message 314 satisfies at least one activation condition 316. If it does, the WLAN radio 304 may send an activation message 318 to the accessory radio 306. More specifically, the WLAN radio driver 330 may send the activation message 318 to the accessory radio driver 332.

In the present disclosure, the WLAN radio 304 and the accessory radio 306 are described as performing various actions and operations. At least some of these actions and operations may be performed by the WLAN radio driver 330 and/or the accessory radio driver 332. Thus, any statement that a WLAN radio 304 (or an accessory radio 306) performs some action or operation encompasses any implementations where the WLAN radio driver 330 (or the accessory radio driver 332) performs the action or operation. For example, a statement that the WLAN radio 304 sends an activation message 318 to an accessory radio 306 encompasses any implementation where the WLAN radio driver 330 sends the activation message 318 to the accessory radio driver 332.

Figure 4:
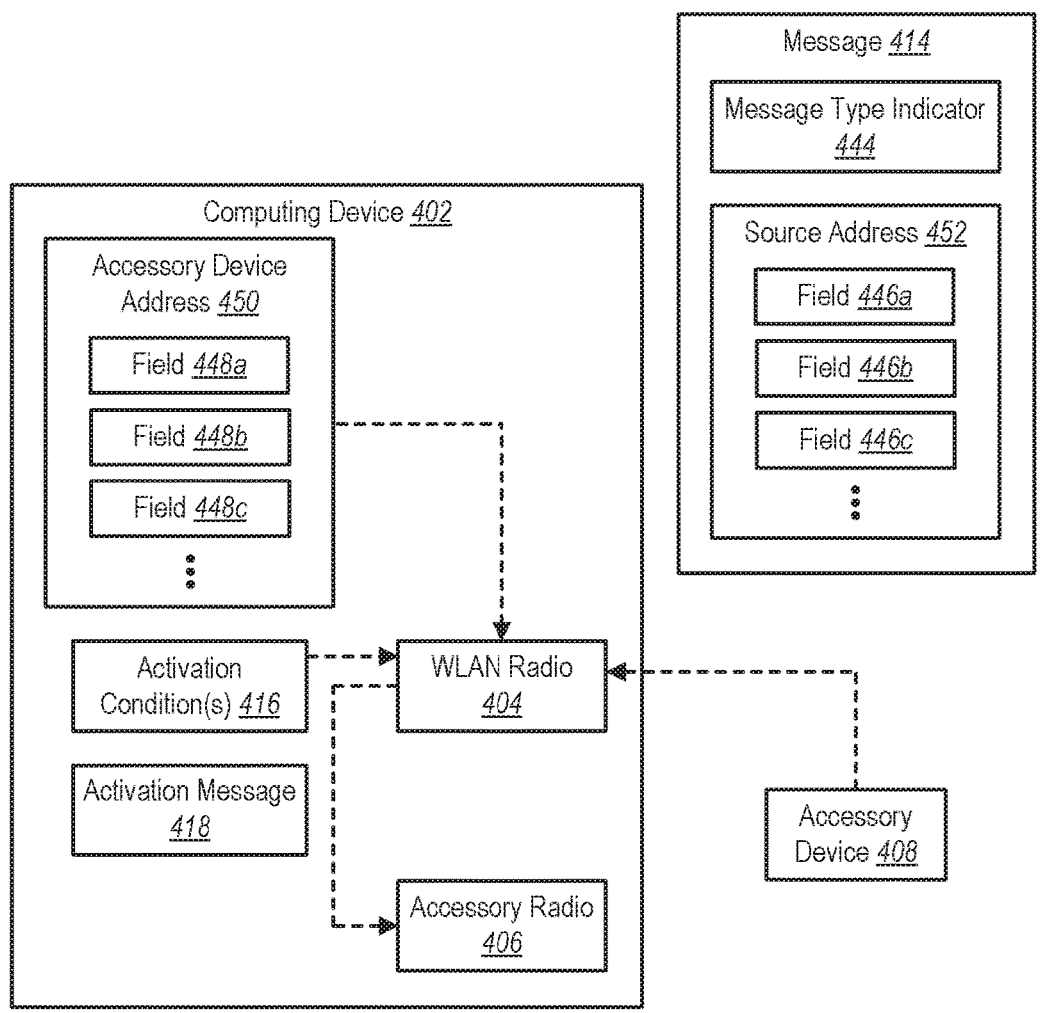
FIG. 4 illustrates an example of a message that may trigger a WLAN radio to send an activation message to an accessory radio.

FIG. 4 illustrates an example of a message 414 that may trigger a WLAN radio 404 to send an activation message 418 to an accessory radio 406. When the WLAN radio 404 receives the message 414, which may be sent by an accessory device 408, the WLAN radio 404 may check to see whether the message 414 satisfies at least one activation condition 416. In some embodiments, an activation condition 416 may specify one or more criteria for a source address 452 in the message 414. For example, the WLAN radio 404 may compare the source address 452 in the message 414 to a known accessory device address 450. If the source address 452 in the message 414 matches the accessory device address 450, the WLAN radio 404 may send an activation message 418 to the accessory radio 406.

In some embodiments, if the message 414 received by the WLAN radio 404 is of a certain type, the WLAN radio 404 may send an activation message 418 to the accessory radio 406 even if the source address 452 in the message 414 only partially matches the accessory device address 450. For example, in some embodiments, the WLAN radio 404 may send an activation message 418 to the accessory radio 406 if two conditions are satisfied: (1) a message type indicator 444 in the message 414 has a certain value or is within a defined range of values (e.g., values indicating that the message 414 is a particular type of message, such as a first-time connection request), and (2) a subset of the fields 446a-c in the source address 452 matches the same subset of fields 448a-c in the accessory device address 450 (e.g., the first three fields 446a-c in the source address 452 match the first three fields 448a-c in the accessory device address 450), even if the other fields do not match.

In alternative embodiments, an activation condition 416 may depend on a destination address in a message 414 received by the WLAN radio 404. For example, the WLAN radio 404 may compare a destination address in the message 414 to the address of the accessory radio 406. If the destination address in the message 414 matches the address of the accessory radio 406, the WLAN radio 404 may send an activation message 418 to the accessory radio 406.

Figure 5:
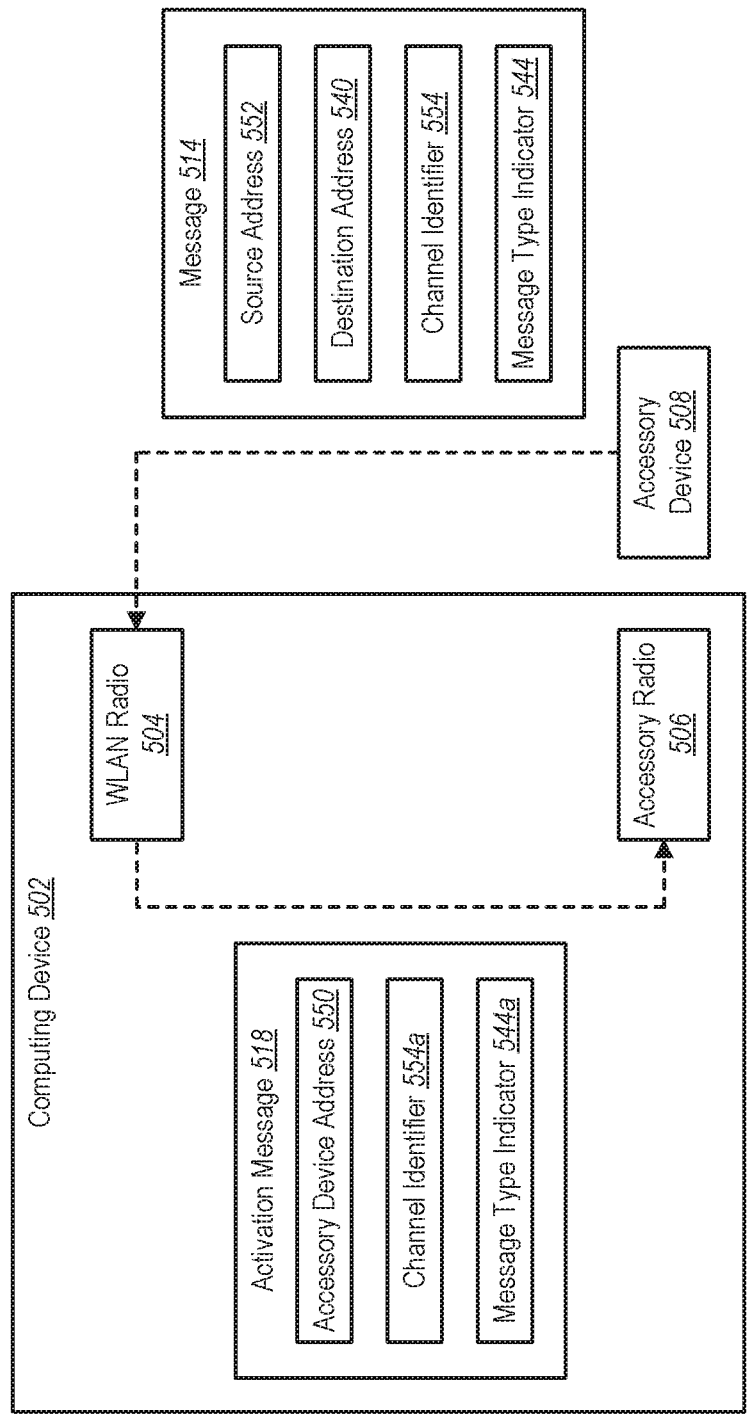
FIG. 5 illustrates an example of an activation message that a WLAN radio may send to an accessory radio.

FIG. 5 illustrates an example of an activation message 518 that a WLAN radio 504 may send to an accessory radio 506. The WLAN radio 504 may send the activation message 518 in response to receiving a message 514 that is intended for the accessory radio 506 (e.g., a message 514 whose source address 552 matches an address 550 of an accessory device 508) while the accessory radio 506 is in a sleep state 222. The activation message 518 may include information that enables the accessory radio 506 to establish a point-to-point wireless connection with the accessory device 508. For example, the activation message 518 may include the address 550 of the accessory device 508 that sent the message 514. The accessory device address 550 may be determined from the source address 552 of the received message 514.

The activation message 518 may also include channel information. In some embodiments, the channel that is used for wireless communication between the computing device 502 and the accessory device 508 may not be static. Multiple wireless channels may be available, and the particular wireless channel that is used may change depending on the circumstances (e.g., whether there is any interference with other wireless devices that are being used in the same vicinity).

The message 514 that the WLAN radio 504 receives on behalf of the accessory radio 506 may include a channel identifier 554, indicating which of the available wireless channels should be used for wireless communication between the computing device 502 and the accessory device 508. The WLAN radio 504 may extract the channel identifier 554 from the message 514 and include a corresponding channel identifier 554a in the activation message 518.

However, it is not necessary to include the channel identifier 554 in the message 514. The WLAN radio 504 may be configured to scan one channel at a time, so the WLAN radio 504 may know the channel on which the message 514 is received even if the channel identifier 554 is not included in the message 514. The WLAN radio 504 may include a channel identifier 554a in the activation message 518 that it sends to the accessory radio 506 even if the message 514 from the accessory device 508 does not include a channel identifier 554.

Whether or not a channel identifier 554 is included in the message 514 received from the accessory device 508, it may be advantageous for the WLAN radio 504 to include a channel identifier 554a in the activation message 518 that it sends to the accessory radio 506. Without knowing the channel identifier 554a, the accessory radio 506 may have to scan multiple wireless channels in order to identify the correct wireless channel to use. Therefore, including the channel identifier 554a in the activation message 518 may reduce the amount of time that it takes for the computing device 502 to establish a wireless connection with the accessory device 508.

The activation message 518 may also include information about the type of message 514 that the WLAN radio 504 received on behalf of the accessory radio 506. More specifically, the activation message 518 may identify a message category to which the received message 514 belongs. For example, if communication between the computing device 502 and the accessory device 508 occurs in accordance with IEEE 802.11, the activation message 518 may indicate whether the message 514 is a probe request, an association request, a service request, a connection request, etc. The message 514 received by the WLAN radio 504 on behalf of the accessory radio 506 may include a message type indicator 544. The WLAN radio 504 may extract the message type indicator 544 from the message 514 and include a corresponding message type indicator 544a in the activation message 518 that is sent to the accessory radio 506. Including the message type indicator 544a in the activation message 518 may enable the accessory radio 506 to respond appropriately to the message 514 from the accessory device 508.

Figure 6:
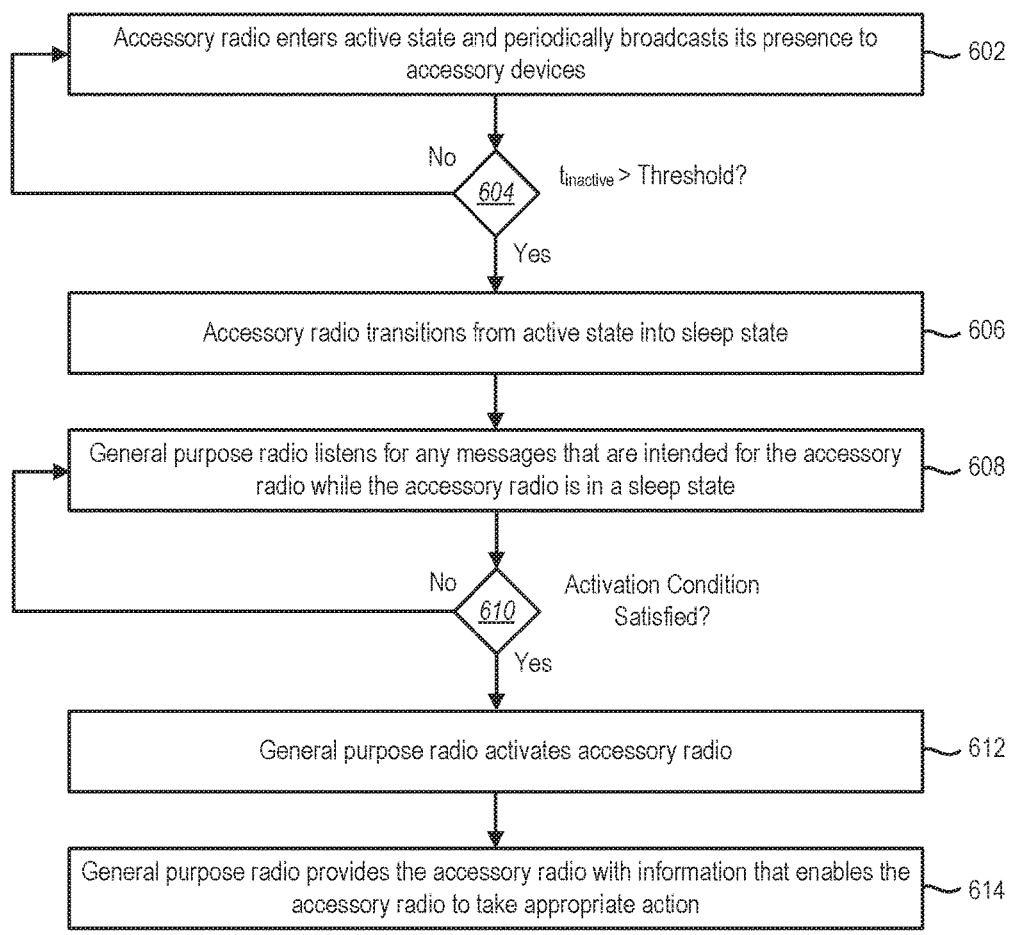
FIG. 6 illustrates an example of a method for saving power in a computing device that has multiple radios.

FIG. 6 illustrates an example of a method 600 for saving power in a computing device 102 that includes multiple radios 104, 106, including a general purpose radio 104 (such as a WLAN radio 304) and an accessory radio 106. In accordance with the method 600, the accessory radio 106 may enter 602 the active state 220 at some point in time. For example, the accessory radio 106 may enter 602 the active state 220 in response to user input, in order to establish a point-to-point wireless connection with an accessory device 108. While in the active state 220, the accessory radio 106 may periodically broadcast its presence to accessory devices 108 by, for example, periodically transmitting a beacon signal.

From time to time, one or more accessory devices 108 may be wirelessly connected to, and subsequently disconnected from, the computing device 102. The accessory radio 106 may remain in the active state 220 as long as it is connected to at least one accessory device 108. At some point, however, the accessory radio 106 may determine that it is not wirelessly connected to any accessory devices 108. If the accessory radio 106 determines 604 that it has been inactive (e.g., the accessory radio 106 has not been connected to any accessory devices 108, and has not received any connection requests) for a period of time that exceeds a defined threshold, the accessory radio 106 may transition 606 from the active state 220 into a sleep state 222. The accessory radio 106 may be configured so that when it is in a sleep state 222, the accessory radio 106 does not periodically transmit a beacon signal (or otherwise broadcast its presence to accessory devices 108). Thus, transitioning 606 the accessory radio 106 into a sleep state 222 may save power and prevent the battery 112 of the computing device 102 from being drained unnecessarily.

In order to enable accessory devices 108 to quickly and conveniently connect to the computing device 102 while the accessory radio 106 is in a sleep state 222, the general purpose radio 104 may listen 608 for any messages 114 that are intended for the accessory radio 106. More specifically, while the accessory radio 106 is in a sleep state 222, the general purpose radio 104 may read and process any messages 114 that are addressed to the accessory radio 106 in addition to reading and processing any messages that are addressed to the general purpose radio 104.

When the general purpose radio 104 receives 610 a message 114 that satisfies one or more activation conditions 116, the general purpose radio 104 may activate 612 the accessory radio 106 (e.g., cause the accessory radio 106 to transition from a sleep state 222 to the active state 220). In addition, the general purpose radio 104 may provide 614 the accessory radio 106 with information that enables the accessory radio 106 to take appropriate action in response to the message 114 that was received. For example, the general purpose radio 104 may send an activation message 118 to the accessory radio 106. The activation message 118 may include an address of the accessory device 108 (e.g., an accessory device address 550) that sent the message 114, channel information (e.g., a channel identifier 554a) that indicates which wireless channel should be used to connect to the accessory device 108, and message type information (e.g., a message type indicator 544a) that indicates the type of message that the general purpose radio 104 received on behalf of the accessory radio 106.

Figure 7:
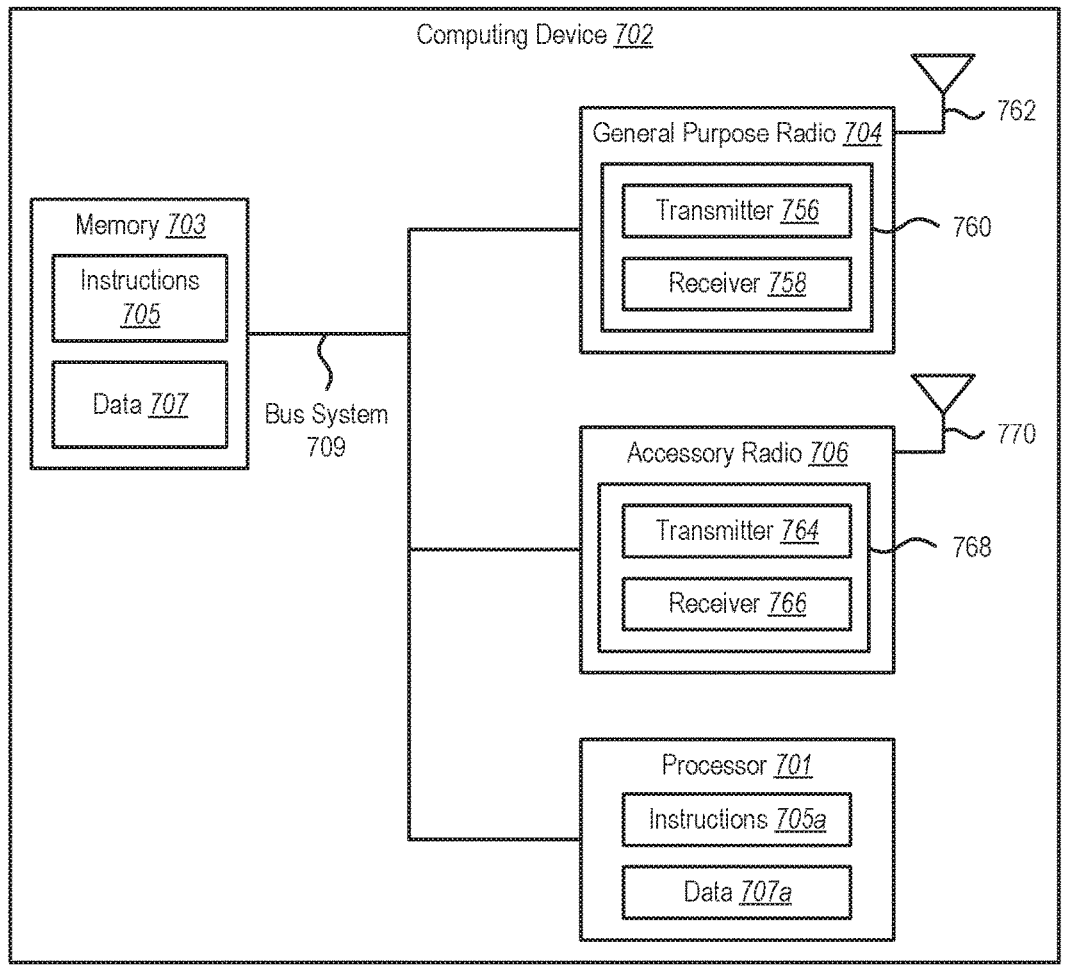
FIG. 7 illustrates certain components that may be included within a computing device.

FIG. 7 illustrates certain components that may be included within a computing device 702. The computing device is an example of the computing devices 102, 302, 402, 502 that have been discussed previously.

The computing device 702 may include a general purpose radio 704 (which, in some embodiments, may take the form of a WLAN radio 304). The general purpose radio 704 may include a transmitter 756 and a receiver 758, which may be collectively referred to as a transceiver 760. The transceiver 760 allows transmission and reception of signals between the computing device 702 and other devices (e.g., other devices 310a, 310b that are connected to a WLAN 324). An antenna 762 may be electrically coupled to the transceiver 760.

The computing device 702 may also include an accessory radio 706. The accessory radio 706 may also include a transmitter 764 and a receiver 766, which may also be collectively referred to as a transceiver 768. The transceiver 768 allows transmission and reception of signals between the computing device 702 and accessory devices 108. An antenna 770 may be electrically coupled to the transceiver 768.

Although in FIG. 7 the general purpose radio 704 and the accessory radio 706 are depicted as using separate antennas 762, 770, in alternative embodiments the general purpose radio 704 and the accessory radio 706 may share the same antenna.

The computing device 702 includes a processor 701. The processor 701 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 701 may be referred to as a central processing unit (CPU). Although just a single processor 701 is shown in the computing device 702 of FIG. 7, in an alternative configuration, a combination of processors (e.g., an ARM and DSP) could be used.

The computing device 702 also includes memory 703. The memory 703 may be any electronic component capable of storing electronic information. For example, the memory 703 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 705 and data 707 may be stored in the memory 703. The instructions 705 may be executable by the processor 701 to implement some or all of the methods disclosed herein. Executing the instructions 705 may involve the use of the data 707 that is stored in the memory 703. When the processor 701 executes the instructions 705, various portions of the instructions 705a may be loaded onto the processor 701, and various pieces of data 707a may be loaded onto the processor 701.

Any of the various examples of modules and components described herein (such as the WLAN radio driver 330, the accessory radio driver 332, etc.) may be implemented, partially or wholly, as instructions 705 stored in memory 703 and executed by the processor 701. Any of the various examples of data described herein (such as the threshold for determining whether the accessory radio 106 transitions to a sleep state 222, the activation condition(s) 116, etc.) may be among the data 707 that is stored in memory 703 and used during execution of the instructions 705 by the processor 701. The messages described herein (e.g., the activation message 118) may also be stored at least temporarily in the memory 703.

The various components of the computing device 702 may be coupled together by one or more buses, which may include a power bus, a control signal bus, a status signal bus, a data bus, etc. For the sake of clarity, the various buses are illustrated in FIG. 7 as a bus system 709.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words "means for" appear together with an associated function. Each addition, deletion, and modification to the embodiments that falls within the meaning and scope of the claims is to be embraced by the claims.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A computing device, comprising:
    an accessory radio that facilitates point-to-point wireless connectivity between the computing device and one or more accessory devices, wherein the accessory radio periodically broadcasts its presence while operating in an active state, and wherein the accessory radio transitions from the active state to a sleep state after a period of inactivity; and
    a general purpose radio that facilitates general wireless connectivity between the computing device and other devices, wherein the general purpose radio listens for any messages from the one or more accessory devices that are intended for the accessory radio while the accessory radio is in the sleep state, and wherein the general purpose radio activates the accessory radio in response to the general purpose radio receiving a message, while the accessory radio is in the sleep state, that satisfies at least one activation condition.

2. The computing device of claim 1, wherein:
    the computing device is not connected to any accessory devices and does not receive any connection requests from any accessory devices during the period of inactivity; and
    the accessory radio transitions from the active state to the sleep state after the period of inactivity exceeds a defined threshold.

3. The computing device of claim 1, wherein:
    the message that the general purpose radio receives while the accessory radio is in the sleep state comprises a source address that matches an address of an accessory device; and
    the general purpose radio activates the accessory radio in response to receiving the message.

4. The computing device of claim 1, wherein:
    the message that the general purpose radio receives while the accessory radio is in the sleep state comprises a source address that partially matches an address of an accessory device, and a message type indicator whose value is within a defined range of values; and
    the general purpose radio activates the accessory radio in response to receiving the message.

5. The computing device of claim 1, wherein the general purpose radio activates the accessory radio by sending an activation message to the accessory radio.

6. The computing device of claim 5, wherein the activation message comprises information that enables the accessory radio to establish a point-to-point wireless connection with an accessory device.

7. The computing device of claim 1, wherein the accessory radio and the general purpose radio operate in accordance with a same wireless communication protocol.

8. The computing device of claim 1, further comprising a battery that supplies operating power to the computing device, wherein the accessory radio uses less power while in the sleep state than in the active state.

9. A computing device, comprising:
    an accessory radio that facilitates point-to-point wireless connectivity between the computing device and one or more accessory devices, wherein the accessory radio periodically transmits a beacon signal while operating in an active state, and wherein the accessory radio transitions from the active state to a sleep state after a period of inactivity exceeds a defined threshold; and a wireless local area network (WLAN) radio that facilitates wireless communication between the computing device and other devices via a WLAN, wherein the WLAN radio receives messages from the one or more accessory devices that are addressed to the accessory radio while the accessory radio is in the sleep state, and wherein the WLAN radio activates the accessory radio in response to the WLAN radio receiving a message, while the accessory radio is in the sleep state, that satisfies at least one activation condition.

10. The computing device of claim 9, wherein the computing device is not connected to any accessory devices and does not receive any connection requests from any accessory devices during the period of inactivity.

11. The computing device of claim 9, wherein:

the message that the WLAN radio receives while the accessory radio is in the sleep state comprises a source address that matches an address of an accessory device; and the WLAN radio activates the accessory radio in response to receiving the message.

12. The computing device of claim 9, wherein:

the message that the WLAN radio receives while the accessory radio is in the sleep state comprises a source address that partially matches an address of an accessory device, and a message type indicator whose value is within a defined range of values; and the WLAN radio activates the accessory radio in response to receiving the message.

13. The computing device of claim 9, wherein:

the computing device further comprises an accessory radio driver that controls the accessory radio and a WLAN radio driver that controls the WLAN radio; and the WLAN radio driver sends an activation message to the accessory radio driver in order to activate the accessory radio.

14. The computing device of claim 13, wherein the activation message comprises:

an address of an accessory device that sends the message that the WLAN radio receives while the accessory radio is in the sleep state;

a message type indicator that identifies a message category to which the message corresponds; and a channel indicator that identifies which of a plurality of available wireless channels should be used for wireless communication between the computing device and the accessory device.

15. The computing device of claim 9, wherein the accessory radio and the WLAN radio both operate in accordance with an Institute of Electrical and Electronics Engineers (IEEE) 802.11 wireless communication protocol.

16. A method for saving power in a computing device that includes a plurality of radios, comprising:

an accessory radio entering an active state and periodically broadcasting its presence to accessory devices while in the active state;

the accessory radio transitioning from the active state into a sleep state after a period of inactivity;

a general purpose radio listening for any messages from the accessory devices that are intended for the accessory radio while the accessory radio is in the sleep state; and the general purpose radio activating the accessory radio in response to the general purpose radio receiving a message, while the accessory radio is in the sleep state, that satisfies at least one activation condition.

17. The method of claim 16, wherein:

the computing device is not connected to any accessory devices and does not receive any connection requests from any accessory devices during the period of inactivity; and the accessory radio transitions from the active state to the sleep state after the period of inactivity exceeds a defined threshold.

18. The method of claim 16, wherein the general purpose radio sends an activation message to the accessory radio in order to activate the accessory radio.

19. The method of claim 18, wherein the activation message comprises information that enables the accessory radio to establish a point-to-point wireless connection with an accessory device.

20. The method of claim 18, wherein the activation message comprises:

an address of an accessory device that sends the message that the general purpose radio receives while the accessory radio is in the sleep state;

a message type indicator that identifies a message category to which the message corresponds; and a channel indicator that identifies which of a plurality of available wireless channels should be used for wireless communication between the computing device and the accessory device.

* * * * *